US007676599B2

(12) United States Patent
Cooney et al.

(10) Patent No.: US 7,676,599 B2
(45) Date of Patent: Mar. 9, 2010

(54) SYSTEM AND METHOD OF BINDING A CLIENT TO A SERVER

(75) Inventors: John M. Cooney, San Carlos, CA (US);
Awais Ali, Santa Clara, CA (US);
Fabrizio Talucci, San Jose, CA (US);
Charlie Zimmerman, San Carlos, CA (US)

(73) Assignee: i2 Telecom IP Holdings, Inc., Southlake, TX (US)

( * ) Notice: Subject to any disclaimer, the term of this patent is extended or adjusted under 35 U.S.C. 154(b) by 200 days.

(21) Appl. No.: 11/043,680

(22) Filed: Jan. 26, 2005

(65) Prior Publication Data

US 2006/0031393 A1 Feb. 9, 2006

Related U.S. Application Data

(60) Provisional application No. 60/539,768, filed on Jan. 28, 2004.

(51) Int. Cl.
| | |
|---|---|
| *G06F 15/16* | (2006.01) |
| *G06F 15/173* | (2006.01) |
| *H04J 1/16* | (2006.01) |
| *H04J 3/14* | (2006.01) |
| *H04L 12/28* | (2006.01) |
| *H04L 12/56* | (2006.01) |
| *G06F 15/177* | (2006.01) |
| *G06F 11/00* | (2006.01) |
| *G01R 31/08* | (2006.01) |
| *G08C 15/00* | (2006.01) |
| *H04L 1/00* | (2006.01) |
| *H04L 12/26* | (2006.01) |

(52) U.S. Cl. .............. 709/245; 709/206; 709/219; 709/225; 709/227; 709/228; 709/237; 709/239; 370/238; 370/395.21; 370/395.32

(58) Field of Classification Search .......... 709/203, 709/206, 207, 219–230, 235, 237–245; 370/232, 370/237, 238, 395.21, 395.32
See application file for complete search history.

(56) References Cited

U.S. PATENT DOCUMENTS

| 5,402,481 A | 3/1995 | Waldman |
| 5,809,128 A | 9/1998 | McMullin |

(Continued)

OTHER PUBLICATIONS

Rosenberg, J. et al. "STUN—Simple Traversal of User Datagram Protocol (UDP) Through Network Address Translators (NATs)," RFC 3489, Mar. 2003, pp. 1-47.*

(Continued)

*Primary Examiner*—Vivek Srivastava
*Assistant Examiner*—Melvin H Pollack
(74) *Attorney, Agent, or Firm*—Toler Law Group

(57) ABSTRACT

A system and method of binding a client with a server. Embodiments of the present invention allow a client to receive and maintain a set of "best-fit" server IP addresses. The best fit server IP addresses establish a hierarchy of server addresses that are used by a client to maintain a binding with a server without using the DNS. Communicating the set of best-fit server IP addresses to a specific client is accomplished using extensions to one or more network protocols already used to support client/server communications, thus minimizing the amount of code needed to support the additional information transfer.

18 Claims, 3 Drawing Sheets

U.S. PATENT DOCUMENTS

| | | | |
|---|---|---|---|
| 5,987,103 A | 11/1999 | Martino | |
| 6,014,440 A | 1/2000 | Melkild et al. | |
| 6,091,732 A | 7/2000 | Alexander, Jr. et al. | |
| 6,104,757 A | 8/2000 | Rhee | |
| 6,118,768 A | 9/2000 | Bhatia et al. | |
| 6,125,113 A | 9/2000 | Farris et al. | |
| 6,141,345 A | 10/2000 | Goeddel et al. | |
| 6,185,288 B1 | 2/2001 | Wong | |
| 6,205,154 B1* | 3/2001 | Schmidt et al. | 370/458 |
| 6,256,778 B1 | 7/2001 | Oliver | |
| 6,307,853 B1 | 10/2001 | Storch et al. | |
| 6,351,464 B1 | 2/2002 | Galvin et al. | |
| 6,351,730 B2 | 2/2002 | Chen | |
| 6,359,880 B1 | 3/2002 | Curry et al. | |
| 6,389,005 B1 | 5/2002 | Cruickshank | |
| 6,434,139 B1 | 8/2002 | Liu et al. | |
| 6,445,694 B1 | 9/2002 | Swartz | |
| 6,449,251 B1 | 9/2002 | Awadallah et al. | |
| 6,496,477 B1 | 12/2002 | Perkins et al. | |
| 6,542,497 B1 | 4/2003 | Curry et al. | |
| 6,597,686 B1 | 7/2003 | Smyk | |
| 6,603,774 B1 | 8/2003 | Knappe et al. | |
| 6,618,761 B2* | 9/2003 | Munger et al. | 709/241 |
| 6,636,504 B1 | 10/2003 | Albers et al. | |
| 6,658,496 B1 | 12/2003 | Minakata et al. | |
| 6,700,956 B2 | 3/2004 | Chang et al. | |
| 6,725,303 B1* | 4/2004 | Hoguta et al. | 710/106 |
| 6,760,324 B1 | 7/2004 | Scott et al. | |
| 6,763,226 B1 | 7/2004 | McZeal, Jr. | |
| 6,766,348 B1* | 7/2004 | Combs et al. | 718/104 |
| 6,771,594 B1 | 8/2004 | Upadrasta | |
| 6,788,769 B1 | 9/2004 | Waites | |
| 6,795,540 B1 | 9/2004 | Mow | |
| 6,822,957 B1 | 11/2004 | Schuster et al. | |
| 6,826,174 B1 | 11/2004 | Erekson et al. | |
| 6,856,612 B1 | 2/2005 | Bjelland et al. | |
| 6,895,000 B2 | 5/2005 | Lai et al. | |
| 6,901,438 B1* | 5/2005 | Davis et al. | 709/219 |
| 6,907,031 B1 | 6/2005 | Ehlinger et al. | |
| 6,947,417 B2 | 9/2005 | Laursen et al. | |
| 6,954,454 B1 | 10/2005 | Schuster et al. | |
| 6,975,613 B1* | 12/2005 | Johansson | 370/338 |
| 6,986,030 B2 | 1/2006 | Shmueli et al. | |
| 7,012,888 B2 | 3/2006 | Schoeneberger et al. | |
| 7,016,481 B2 | 3/2006 | McElvaney | |
| 7,042,841 B2 | 5/2006 | Abdelilah et al. | |
| 7,046,683 B1 | 5/2006 | Zhao | |
| 7,092,380 B1 | 8/2006 | Chen et al. | |
| 7,113,500 B1 | 9/2006 | Bollinger et al. | |
| 7,139,926 B1* | 11/2006 | Madhav et al. | 714/4 |
| 7,145,900 B2 | 12/2006 | Nix et al. | |
| 7,162,549 B2 | 1/2007 | Mambakkam et al. | |
| 7,212,622 B2 | 5/2007 | Delaney et al. | |
| 7,213,766 B2 | 5/2007 | Ryan et al. | |
| 7,227,938 B2 | 6/2007 | Rodman et al. | |
| 7,254,630 B1* | 8/2007 | Daude et al. | 709/224 |
| 7,269,180 B2* | 9/2007 | Bly et al. | 370/412 |
| 7,274,658 B2* | 9/2007 | Bornstein et al. | 370/227 |
| 7,283,542 B2 | 10/2007 | Mitchell | |
| 7,302,053 B2 | 11/2007 | Chang et al. | |
| 7,307,982 B2 | 12/2007 | Burritt et al. | |
| 7,325,133 B2 | 1/2008 | Fascenda | |
| 7,359,963 B1* | 4/2008 | Huang et al. | 709/223 |
| 7,512,702 B1* | 3/2009 | Srivastava et al. | 709/238 |
| 2001/0038033 A1 | 11/2001 | Habib | |
| 2002/0052965 A1 | 5/2002 | Dowling | |
| 2002/0097843 A1 | 7/2002 | Krol et al. | |
| 2002/0131604 A1 | 9/2002 | Amine | |
| 2002/0138648 A1* | 9/2002 | Liu | 709/245 |
| 2002/0184376 A1* | 12/2002 | Sternagle | 709/230 |
| 2002/0191621 A1 | 12/2002 | Jha | |
| 2002/0191768 A1 | 12/2002 | Stoughton | |
| 2003/0002479 A1 | 1/2003 | Vortman et al. | |
| 2003/0023669 A1* | 1/2003 | DeLima et al. | 709/203 |
| 2003/0110257 A1* | 6/2003 | Hyun et al. | 709/224 |
| 2003/0112820 A1 | 6/2003 | Beach | |
| 2003/0123388 A1 | 7/2003 | Bradd | |
| 2003/0161453 A1 | 8/2003 | Veschi | |
| 2003/0204619 A1* | 10/2003 | Bays | 709/238 |
| 2003/0214939 A1 | 11/2003 | Eldumiati et al. | |
| 2003/0219006 A1 | 11/2003 | Har | |
| 2004/0019539 A1 | 1/2004 | Raman et al. | |
| 2004/0032860 A1 | 2/2004 | Mundra et al. | |
| 2004/0047451 A1 | 3/2004 | Barker et al. | |
| 2004/0086093 A1 | 5/2004 | Schranz | |
| 2004/0114581 A1 | 6/2004 | Hans et al. | |
| 2004/0133668 A1 | 7/2004 | Nicholas, III | |
| 2004/0141508 A1 | 7/2004 | Schoeneberger et al. | |
| 2004/0141758 A1 | 7/2004 | El-Reedy | |
| 2004/0205023 A1 | 10/2004 | Hafer et al. | |
| 2004/0205165 A1* | 10/2004 | Melamed et al. | 709/219 |
| 2004/0205777 A1 | 10/2004 | Zalenski et al. | |
| 2004/0218583 A1 | 11/2004 | Adan et al. | |
| 2004/0223458 A1 | 11/2004 | Gentle | |
| 2004/0248590 A1 | 12/2004 | Chan et al. | |
| 2004/0258003 A1 | 12/2004 | Kokot et al. | |
| 2005/0002506 A1 | 1/2005 | Bender et al. | |
| 2005/0074031 A1 | 4/2005 | Sunstrum | |
| 2005/0089052 A1 | 4/2005 | Chen et al. | |
| 2005/0091392 A1 | 4/2005 | Gesswein et al. | |
| 2005/0094621 A1 | 5/2005 | Acharya et al. | |
| 2005/0111494 A1* | 5/2005 | Kecskemeti | 370/521 |
| 2005/0138183 A1 | 6/2005 | O'Rourke et al. | |
| 2005/0141560 A1* | 6/2005 | Muthiah | 370/474 |
| 2005/0180464 A1 | 8/2005 | McConnell et al. | |
| 2005/0195799 A1 | 9/2005 | Burne et al. | |
| 2005/0201414 A1 | 9/2005 | Awais | |
| 2005/0220083 A1 | 10/2005 | Takeuchi | |
| 2005/0243733 A1 | 11/2005 | Crawford et al. | |
| 2006/0008059 A1 | 1/2006 | Ying et al. | |
| 2006/0029062 A1 | 2/2006 | Rao et al. | |
| 2006/0029063 A1 | 2/2006 | Rao et al. | |
| 2006/0034296 A1 | 2/2006 | Talucci | |
| 2006/0037071 A1 | 2/2006 | Rao et al. | |
| 2006/0039356 A1 | 2/2006 | Rao et al. | |
| 2006/0088025 A1 | 4/2006 | Barkley et al. | |
| 2006/0208066 A1 | 9/2006 | Finn et al. | |
| 2006/0276230 A1 | 12/2006 | McConnell | |
| 2007/0248081 A1 | 10/2007 | Barkley et al. | |
| 2008/0025291 A1 | 1/2008 | Barkley et al. | |

OTHER PUBLICATIONS

Schulzrinne, H. "Dynamic Host Configuration Protocol Option for SIP," RFC 3361, Aug. 2002, pp. 1-7.*

Camarillo, G. et al. "Integration of Resource Management and SIP," RFC 3312, Oct. 2002, pp. 1-30.*

"EcoCarrier-carrier, long distance, call, VoIP, ITSP, service", www.ecocarrier.com, printed Jun. 13, 2005, pp. 1-3.

"EcoPhone+VoIP!Phone Q-FONE-USB", which appears to come from www.qiiq.com, Jun. 10, 2005, printed Jun. 10, 2005, pp. 1-3.

"Brief Introduction to QiiQ Communications Inc. and Eccocarrier Inc.", www.qiiq.com, printed Jun. 10, 2005 and Jul. 17, 2005, pp. 1-7.

Trembley, J. "VoIP makes real-time billing a necessity", Billing Plus, vol. 6, No. 17, Oct. 4, 2004, p. 13.

"Pre-paid Call Credits—Adding Extra Call Credits", www.2hands.com.au, (added to catalog Jun. 30, 2004), printed Jun. 1, 2005, pp. 1-2.

"SIPphoneCasting. Inspired by: Skype Podcast Recorder=SkypeCasters", linuxathome.com, Dec. 29, 2004, pp. 1-4.

"CommGenie VoIP Suite", www.nexge.com, printed Jun. 1, 2005, pp. 1-3.

"Web Based, VoIP Billing, VoIP Routing, and VoIP Management Software", www.webvoip.com, printed Jun. 1, 2005, pp. 1-2.

Tittel, E. "Cool Tools: USB Desktop Peripherals and Devices", www.certmag.com, Jun. 2005, pp. 1-7.

Bennet, B. "Memory in a Flash", www.theage.com.au, Jan. 31, 2004, pp. 1-3.

"Pocki Phone VoIP Softphone+USB Flash Disk Drive (128M)", www.welltech.com/newsletter/vol_5/20041005.htm, Oct. 5, 2004, 2 pages.

Rosenberg, J. et al., "SIP: Session Initiation Protocol," RFC 3261, Jun. 2002, pp. 1-18.

U.S. Appl. No. 10/969,516, entitled "Portable VoIP Service Access Module," filed Oct. 20, 2004, by Barkley et al.

Douglas F. Bender, U.S. Appl. No. 12/098,947, entitled "Systems and Methods of Making a Call," filed Apr. 7, 2008, 32 pages.

* cited by examiner

SYSTEM AND METHOD OF BINDING A CLIENT TO A SERVER

CROSS REFERENCE TO RELATED APPLICATIONS

This application claims priority under 35 U.S.C. § 119(e) from provisional application No. 60/539,768 filed Jan. 28, 2004. The 60/539,768 provisional application is incorporated by reference herein, in its entirety, for all purposes.

BACKGROUND

The present invention relates generally to implementation of client-server networks. More particularly, the present invention provides systems and methods for maintaining the binding of a client, particularly a client with limited computational and storage resources, with at least one server.

The Internet has had a profound impact on the way society communicates. Today, the Internet is used for personal communications, for business communications, for shopping, for entertainment, for news, and more.

There are many applications that rely on a client being in constant contact with a server in order to perform a task. Typically, this requirement is constrained by several factors:

The client resides on a small specialized computer, with extremely limited computational and storage resources (herein, an "Internet Appliance").

The client to server connection (binding) is mission critical and must be maintained constantly. A tolerable interruption in communications is approximately thirty-seconds within a one-hour interval.

To remove the potential for a "single point of failure" multiple servers must be deployed, geographically separated and independently addressable on the Internet. The number of servers could range into the hundreds.

There are expected to be millions of clients, to reduce the impact of a server failing and to maintain responsiveness of client/server bindings, clients must be distributed across all available servers.

The binding between client and server must be dynamic. There are many potential causes for a client to need to change the server to which it is bound.

The need for a dynamic binding between a client and server is dictated by a number of factors. To insure that combined server resources are being allocated to provide optimal service to all clients, clients are distributed among servers. The distribution takes into account the "routing distance" between a client and the server (the number of Internet hops as well as message delivery latency). As more clients are added, the distribution may become sub-optimum and require adjustment, requiring in turn that some clients be redirected to different servers. Another benefit of dynamic binding between client and server is to provide for continuity of client services in the event a server fails or is pulled off-line for maintenance.

The traditional approach for a client to identify and then bind with a server relies on the Internet Distributed Name Service (DNS), which can associate a static list of Internet IP addresses with a name. While machines respond to IP addresses in the form of number strings, humans are not adept at remembering them. A name server receives a name from a client, associates the name with an IP address, and sends the IP address to a client. The client then communicates with a server via the server's IP address.

The DNS is, however, far from simple. DNS servers receive millions of requests each day. Because a single DNS server may not know the address associated with a particular name, DNS servers must also be able to contact other DNS servers. A name server would start its search for an IP address by contacting one of the root name servers. The root servers know the IP address for all of the name servers that handle the top-level domains. For example, a name server might "ask" a root server for the IP address associated with www.Yahoo.com, and the root might "respond" (assuming no caching), "I don't know the IP address for Yahoo.com, but here's the IP address for the COM name server." One of the keys to making this work is redundancy. There are multiple name servers at every level, so if one fails, there are others to handle the requests.

To speed up the process, name servers cache the IP addresses returned in response to a request. Name servers do not cache forever, though. The caching has a component, called the Time To Live (TTL) that controls how long a server will cache a piece of information. When the server receives an IP address, it receives the TTL with it. The name server will cache the IP address for that period of time (ranging from minutes to days) and then discard it. The TTL allows changes in name servers to propagate.

Not all name servers respect the TTL they receive, however. This means that new information and old information may reside in the DNS at the same time. Sometimes, it takes weeks for a change in an IP address to propagate throughout the Web. Additionally, implementing the DNS protocol on the Internet Appliance requires additional computational, program storage and data storage resources that may not be available or desirable to add.

What would be useful is a system and method for permitting a client running on an Internet Appliance to dynamically bind with at least one server without using DNS.

Detailed Description

Embodiments of the present invention allow a client to receive and maintain a set of "best-fit" server IP addresses. The best fit server IP addresses establish a hierarchy of server addresses that are used by a client to maintain a binding with a server without using the DNS. In the case of an Internet Appliance, the set of best-fit server IP addresses is relatively small. In one embodiment, an Internet Appliance maintains a set of three best-fit server IP addresses. However, this is not meant as a limitation. As will be apparent to those skilled in the art, any number best-fit server IP addresses may be maintained by a client/Internet Appliance without departing from the scope of the present invention. Communicating the set of best-fit server IP addresses to a specific client is accomplished using extensions of a network protocol already used to support client/server communications, thus minimizing the amount of code needed to support the additional information transfer.

It is therefore an aspect of the present invention to provide and maintain a set of best-fit server IP addresses with a client.

It is another aspect of the present invention to provide a set of best-fit server IP addresses to a client via a protocol used by the client and server to establish and/or conduct communications.

It is still another aspect of the present invention to use a set of best-fit server IP addresses to dynamically bind a client with a server, either at the initialization of a session between the client and server or as a result of a loss of connectivity between the client and server, without using DNS.

Another aspect of the present invention is to minimize the overhead required to dynamically bind a client with a server without using DNS.

These and other embodiments of the present invention will become apparent from a review of the general and detailed descriptions that follow.

An embodiment of the present invention provides a method for maintaining the binding of a client with a server. A server creates a list comprising of a list of best-fit server IP addresses for a client. Optionally, the list of best-fit server IP addresses are ordered according to network distribution criteria selected from the group consisting of the routing distance between the client and each server associated with each of the list of best-fit server IP addresses, message delivery latency, and server loading. A transmission protocol used by the client and the server is extended for communications to transport the best-fit server IP list. The best-fit server IP list is sent to the client. In another embodiment of the present invention, an SIP protocol message is extended and the best-fit server IP list is sent to the client using an extended SIP protocol message comprising the best-fit server IP list.

Another method of the present invention provides for initiating the binding of a client with a server. A best-fit server IP address is selected by a client from a list of best-fit server IP addresses. An attempt to made by the client to initiate a session with a server using the selected best-fit server IP address. In the event the first attempt to initiate a session fails, a next best-fit server IP address is selected from a best-fit server IP address list. The client makes a next attempt to initiate a session with a server using the next selected best-fit server IP address. In another embodiment of the present invention, the best-fit server IP address list is ordered according to network distribution criteria. Optionally, the distribution criteria are selected from the group consisting of the routing distance between the client and each server associated with each of the list of best-fit server IP addresses, message delivery latency, and server loading. Selecting the first and next best-fit server IP addresses from a best-fit server IP address list comprises selecting the best-fit server IP addresses according to the order in which the best-fit server IP addresses appear on the best-fit server IP address list.

Another method of the present invention provides for maintaining the binding of a client with a server. A transmission protocol used by the client and the server is extended for communications. The extended transmission protocol is used by a client to request a best-fit server IP list from a server, wherein the best-fit server IP list comprises a list of best-fit server IP addresses. The best-fit server IP list is received and stored by the client. In an embodiment of the present invention, the STUN protocol message is extended and used to request a best-fit server IP list.

In yet another embodiment of the present invention, the client determines whether the IP address of a server is on the best-fit IP address list. In the event that the server is not on the best-fit IP address list, the client terminates its association with the server and selects a best-fit server IP address from a best-fit server IP address list. An attempt is made by the client to initiate a session using the selected best-fit server IP address. In the event the first attempt to initiate a session fails, a next best-fit server IP address is selected from a best-fit server IP address list. A next attempt is made by the client to initiate a session using the next selected best-fit server IP address. Optionally, the best-fit server IP addresses are ordered according to network distribution criteria. The network distribution criteria are selected from the group consisting of the routing distance between the client and each server associated with each of the list of best-fit server IP addresses, message delivery latency, and server loading.

In another embodiment of the present invention, the client determines whether a connection between the client and a server has been lost. In the event that the connection has been lost, a best-fit server IP address is selected from the best-fit server IP address list. An attempt is made by the client to initiate a session using the selected best-fit server IP address. In the event the first attempt to initiate a session fails, a next best-fit server IP address is selected from a best-fit server IP address list. The client makes a next attempt to initiate a session using the next selected best-fit server IP address.

Optionally, the best-fit server IP addresses are ordered according to network distribution criteria. The network distribution criteria are selected from the group consisting of the routing distance between the client and each server associated with each of the list of best-fit server IP addresses, message delivery latency, and server loading.

DETAILED DESCRIPTION

Embodiments of the present invention allow a client to receive and maintain a set of "best-fit" server IP addresses. The best fit server IP addresses establish a hierarchy of server addresses that are used by a client to maintain a binding with a server without using the DNS. In the case of an Internet Appliance, the set of best-fit server IP addresses is relatively small. In one embodiment, an Internet Appliance maintains a set of three best-fit server IP addresses. Communicating the set of best-fit server IP addresses to a specific client is accomplished using extensions of network protocols already used to support client/server communications, thus minimizing the amount of code needed to support the additional information transfer.

Figure 1:
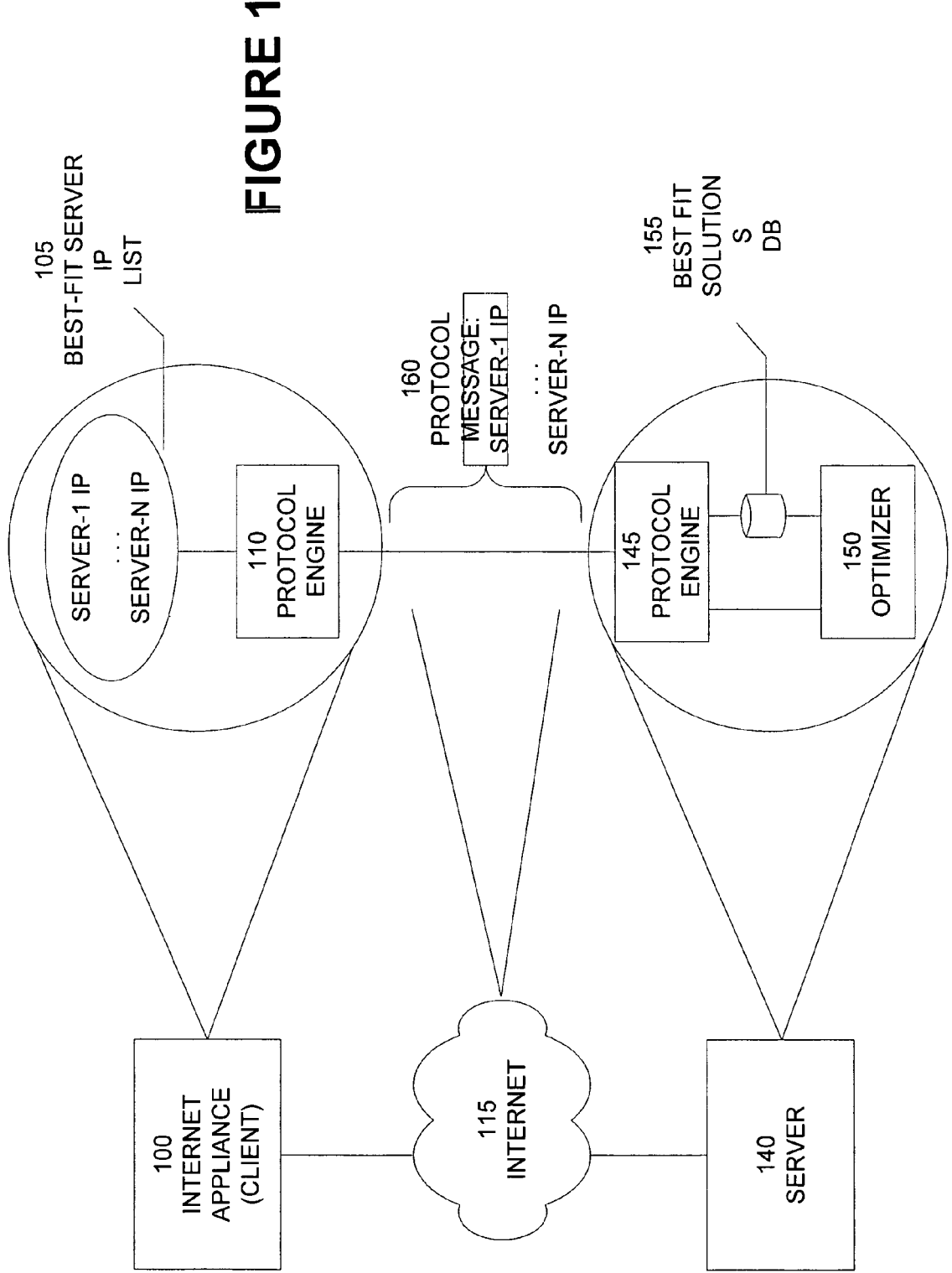
FIG. 1 illustrates the interaction of an Internet Appliance with a server according to embodiments of the present invention.

FIG. 1 illustrates the interaction of an Internet Appliance with a server according to embodiments of the present invention. Referring to FIG. 1, an Internet Appliance (client) 100 comprises a protocol engine 110 connected to the Internet 115. The protocol engine 110 communicates via the Internet 115 with a corresponding protocol engine 145 in a server 140. As part of this communication, protocol message 160 comprising best-fit server IP addresses are passed from the server 140 to the Internet Appliance (client) 100. The Internet Appliance (client) 100 extracts this information from the protocol message 160 and saves this information in persistent memory (not illustrated).

In order to construct the protocol message 160 comprising the best-fit IP addresses, the protocol engine 145 on server 140 is integrated with a best-fit solutions database 155. In this embodiment of the present invention, the best-fit solutions database 155 is updated by an optimizer program 150 that runs as a background application on the server 140. However, this is not meant as a limitation. As would be apparent to those skilled in the art, other means may be used to create the best-fit IP addresses. By way of illustration and not as a limitation, in an embodiment of the present invention, the best-fit IP addresses are computed on-the-fly (by protocol engine 145 or a linked device) based on the latest routing and server availability information.

Figure 2:
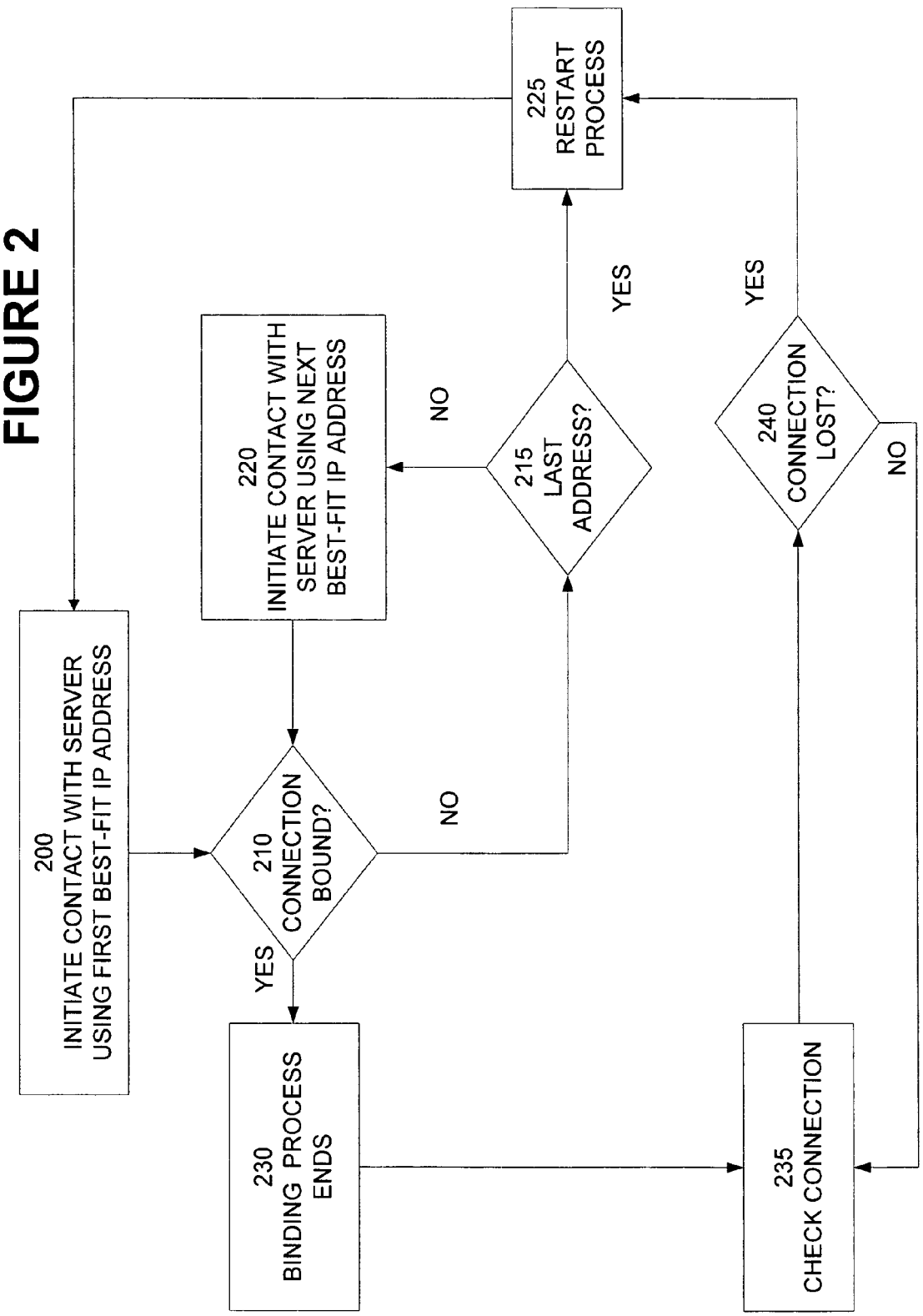
FIG. 2 illustrates a process according to embodiments of the present invention in which an Internet Appliance (client) uses best-fit IP address to create a binding with a server.

FIG. 2 illustrates a process according to embodiments of the present invention in which an Internet Appliance (client) uses best-fit IP address to create a binding with a server. Referring to FIG. 2, a client initiates contact with a server using the first best-fit IP address in the list 200. If the connection is bound 210 the binding process ends 230. If the client is not bound to a server, a check is made to determine if the last-tried best-fit address was the last address 215. If the last-tried best-fit address was the last address, the binding process is restarted 225. If the last-tried best-fit address is not the last address, contact is initiated using the next best-fit address 220.

When a binding is successful (230), the connection is checked 235 to determine if the connection has been lost 240. If the connection has not been lost, the checking process 235 is repeated. If the connection has been lost, the binding process is restarted 225. If none of the servers in the best-fit server IP address list 105 respond then, a "catastrophic" failure has occurred. This could be caused because the user's Internet access has been impaired, because a sufficiently large part of the Internet is disabled preventing access to any of the servers in the best-fit list, or because a sufficiently large physical event has caused all the servers in the best-fit list to become inoperable. When a "catastrophic" failure occurs, the client continues to contact the servers on its best-fit list until the network problem is corrected. This re-use of the initialization procedure helps address the constraint of scarce storage resources on the Internet Appliance.

In an embodiment of the present invention, the list of best-fit server IP addresses 105 is ordered such that elements closer to the top of the list are "more optimal" than lower items on the list. Thus, the binding process illustrated in FIG. 2 attempts to bind with the more optimal server first. In this context, "more optimal" reflects the result of analysis done prior to the last down load of the best-fit list from the server to the client. Note subsequent to the last sending of the best-fit list and the time when the client is bound to a server, the physical location or Internet "routing distance" may have changed thereby changing the optimization of the best-fit list.

Figure 3:
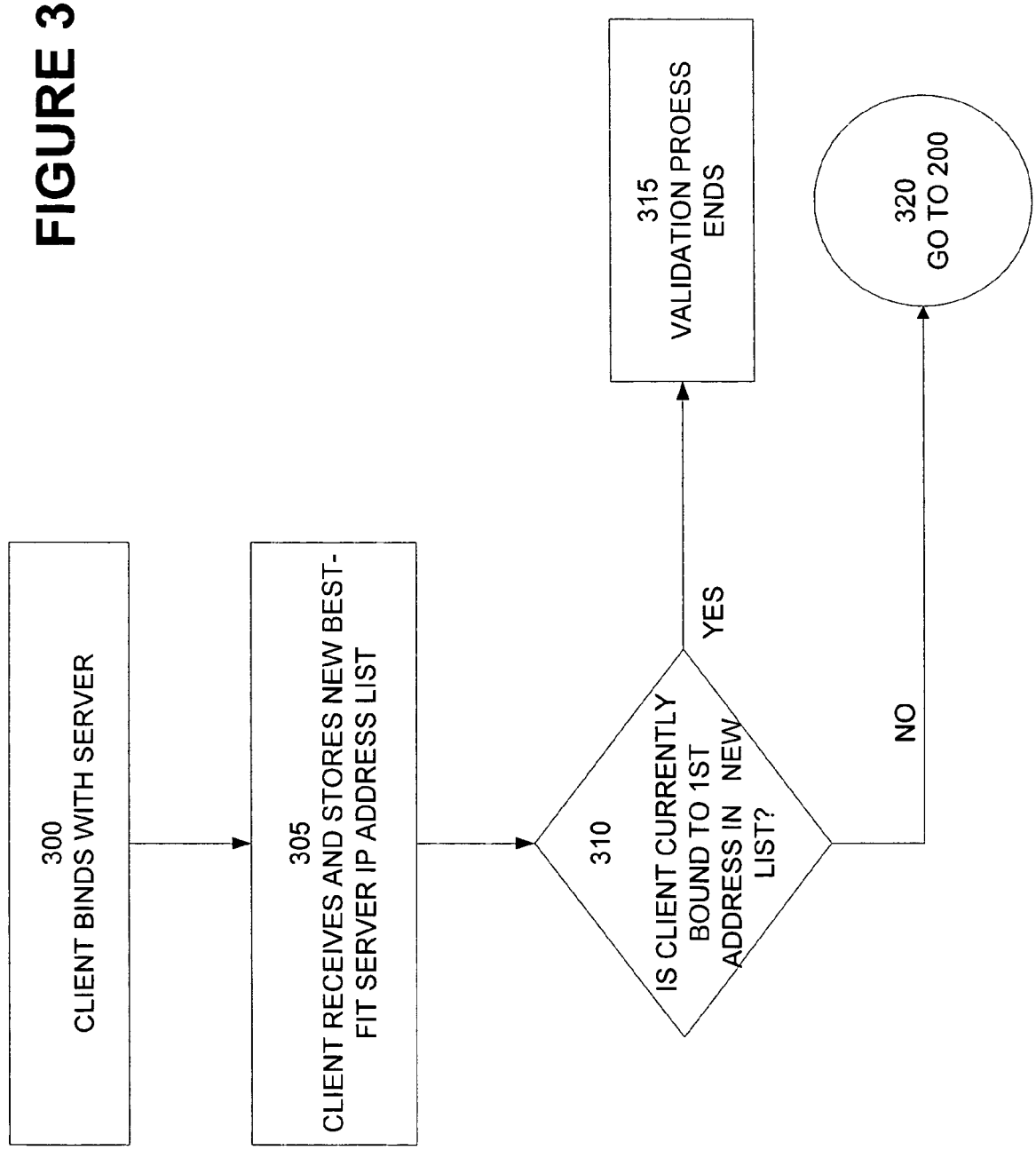
FIG. 3 illustrates a process of receiving and verifying a best-fit list by a client according to embodiments of the present invention.

FIG. 3 illustrates a process of receiving and verifying a best-fit list by a client according to embodiments of the present invention. Referring to FIG. 3, a client binds with a server 300. A new best-fit server IP address list is received and stored by the client 305 for access during power up initialization. Once stored, the client determines whether it is currently bound to a server having the first best-fit address in the new list 310. If it is not, then the client initiates a binding process as illustrated in FIG. 2.

As previously noted, the server determines the best-fit list of server IP addresses and communicates this information to the client via a extension of a network protocol currently used by the client and server to establish or maintain existing communications. In an embodiment of the present invention, a protocol engine at the server is extended to accept a best-fit server IP address list and communicate it to each client associated with that server. In the event the server associated with a client is no longer on the list of best-fit server IP addresses, the client will terminate the association and attempt to connect with a server on the last-received list. The server represented by the first IP address on the new best-fit list is then associated with the client.

An embodiment of the present invention extends a network protocol used by a client and server to convey information relating to the best-fit server IP address list. In order to avoid issues with firewalls and network address translation systems, a preferred protocol will support sessions initiated by the client that allow subsequent responses by the server. Additionally, the preferred protocol will support communication at a frequency that facilitates timely communication of new best-fit server IP address lists and be adaptable to accept the simple payload data required for the best-fit server IP address list.

In an exemplary embodiment of the present invention, a client and server use multiple protocols to send and update best-fit IP address information. By way of illustration and not as a limitation, a server communicates with a client via the Session Initiation Protocol (SIP). This protocol meets the preferred criteria that a session is initiated by the client while allowing the server to send the client a message at any time. However, processing of the SIP protocol for both the client and the server requires considerable work. This is of particular concern where the client resides on an Internet Appliance with very little computation resources. In addition to SIP, the client in this exemplary embodiment also uses the STUN protocol. STUN lacks that quality of being able to respond to a server-generated message at any time, but has the advantage that it is very simple to process and extend. These two protocols, however, are used in combination to perform the tasks of sending a list of best-fist IP addresses to the client and sending the client notice that the list has been updated. The server uses a SIP protocol extension to notify the client. The client uses the STUN protocol to request and receive the new list.

A system and method for permitting a client running on an Internet Appliance to dynamically bind with at least one server without using DNS has been illustrated. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

What is claimed is:

1. A method comprising:
   receiving, at the server, a connection request from a client;
   determining a plurality of best-fit server IP addresses for the client; and
   sending the plurality of best-fit server IP addresses to the client, wherein at least one of the plurality of best-fit server IP addresses is used by the client to bind the client to the server.

2. The method of claim 1, further comprising ordering the plurality of the best-fit server IP addresses according to network distribution criteria to generate an ordered plurality of best-fit server IP addresses and sending the ordered plurality of best-fit server IP addresses to the client.

3. The method of claim 2, wherein the network distribution criteria include a routing distance between the client and each server associated with plurality of best-fit server IP addresses.

4. The method of claim 1, further comprising extending a transmission protocol used by the client and server for communications to send the plurality of best-fit server IP addresses by including the plurality of best-fit server IP addresses in a payload of a SIP protocol message.

5. A method comprising:
   accessing, from a memory of a client device, a list including a plurality of server IP addresses selected based on the network distribution criteria, wherein at least one of the plurality of server IP addresses is used by the client device to bind the client device to a server;
   selecting a first server IP address from the list of server IP addresses;
   making a first attempt to initiate a session with a first server using the first server IP address;

when the first attempt fails, selecting a second server IP address from the list of server IP addresses; and making a second attempt to initiate the session using the selected second server IP address.

6. The method of claim 5, wherein the list of server IP addresses is ordered in the memory according to network distribution criteria, and wherein the first server IP address is a better fit with respect to the network distribution criteria than the second server IP address.

7. The method of claim 6, wherein the network distribution criteria includes message delivery latency.

8. A method comprising:

sending a request for a list of best-fit server IP addresses from a client to a first server;

receiving the list of best-fit server IP addresses sent from the first server, wherein at least one of the best-fit server IP addresses is used by the client to bind the client to a server having an address on the list; and when a server IP address of the first server is not in the list of best-fit server IP addresses, attempting to initiate a session with a second server, wherein a server IP address of the second server is in the list of best-fit server IP addresses.

9. The method of claim 8, comprising:

storing the list of best-fit server IP addresses at the client.

10. The method of claim 8, wherein the request for the list of best-fit server IP addresses is sent via a STUN protocol message.

11. The method of claim 8, wherein the list of best-fit server IP addresses is ordered according to network distribution criteria.

12. The method of claim 11, wherein the network distribution criteria includes a routing distance between the client and each server associated with each address in the list of best-fit server IP addresses.

13. The method of claim 9, further comprising:

determining at the client whether a connection between the client and a particular server has been lost;

when the connection has been lost, selecting a subsequent best-fit server IP address from the list of best-fit server IP addresses; and attempting to initiate a session using the selected subsequent best-fit server IP address.

14. The method of claim 11, wherein the network distribution criteria include server loading.

15. The method of claim 2, wherein the network distribution criteria include server loading of each server associated with the plurality of best-fit sever IP addresses.

16. The method of claim 2, wherein the network distribution criteria include message delivery latency between the client and each server associated with the plurality of best-fit server IP addresses.

17. The method of claim 8, wherein the list of the best-fit server IP addresses includes at least three server IP addresses.

18. The method of claim 8, wherein the request is sent via a STUN protocol message and the list of best-fit server IP address is received via a SIP protocol message.

* * * * *

UNITED STATES PATENT AND TRADEMARK OFFICE
CERTIFICATE OF CORRECTION

PATENT NO. : 7,676,599 B2
APPLICATION NO. : 11/043680
DATED : March 9, 2010
INVENTOR(S) : John M. Cooney et al.

It is certified that error appears in the above-identified patent and that said Letters Patent is hereby corrected as shown below:

In the Claims section, Column 6, Claim 1, Line 38, "receiving, at the server, a connection request from a client" should read --receiving, at a server, a connection request from a client--.

In the Claims section, Column 6, Claim 2, Line 46, "plurality of the best-fit server IP addresses according to net-" should read --plurality of best-fit server IP addresses according to net- --.

In the Claims section, Column 6, Claim 3, Line 52, "server associated with plurality of best-fit server IP addresses" should read --server associated with the plurality of best-fit server IP addresses--.

In the Claims section, Column 6, Claim 4, Line 54, "transmission protocol used by the client and server for communications" should read --transmission protocol used by the client and the server for communications--.

In the Claims section, Column 6, Claim 5, Line 61, "based on the network distribution criteria, wherein at least one of" should read --based on network distribution criteria, wherein at least one of--.

In the Claims section, Column 7, Claim 6, Line 6, "addresses is ordered in the memory according to network" should read --addresses is ordered in the memory according to the network--.

In the Claims section, Column 8, Claim 15, Line 20, "with the plurality of best-fit sever IP addresses" should read --with the plurality of best-fit server IP addresses--.

Signed and Sealed this

Seventeenth Day of August, 2010

David J. Kappos
*Director of the United States Patent and Trademark Office*